(12) United States Patent
Saito et al.

(10) Patent No.: US 6,549,874 B2
(45) Date of Patent: Apr. 15, 2003

(54) DISTANCE MEASURING DEVICE

(75) Inventors: Hiroyuki Saito, Chiba-ken (JP); Kenji Hyakutake, Chiba-ken (JP)

(73) Assignee: Seiko Precision Inc. (JP)

( * ) Notice: Subject to any disclaimer, the term of this patent is extended or adjusted under 35 U.S.C. 154(b) by 88 days.

(21) Appl. No.: 09/772,013

(22) Filed: Jan. 29, 2001

(65) Prior Publication Data

US 2002/0032543 A1 Mar. 14, 2002

(30) Foreign Application Priority Data

Jan. 28, 2000 (JP) ......................................... 2000-019906

(51) Int. Cl.[7] .............................................. G01B 11/02
(52) U.S. Cl. ....................... 702/159; 702/158; 356/3.13; 356/4.01; 356/4.07; 396/99; 396/106; 396/125
(58) Field of Search .......................... 396/99, 106, 125; 356/3.13, 4.01, 4.07; 702/159, 158

(56) References Cited

U.S. PATENT DOCUMENTS 4,760,419 A * 7/1988 Fujiwara et al. ............ 352/140
5,852,386 A * 12/1998 Chantry et al. ................. 331/3

* cited by examiner

Primary Examiner—Kamini Shah
Assistant Examiner—Stephen J. Cherry
(74) Attorney, Agent, or Firm—Adams & Wilks

(57) ABSTRACT

A distance measuring device is provided with regulating circuit for removing offset voltages. Before conducting distance measurement, the regulating circuit outputs a reference voltage on the basis of offset voltages of an amplifier and an integrating circuit used to amplify and integrated reflected light from an object. The regulating circuit comprises a D/A converter for outputting an analog voltage. A value representing the offset voltages is stored and, at the time of distance measurement, the reference voltage is set based on the stored value. The integrating circuit integrates two outputs of the amplifier based on near-side and far-side light receiving means, and uses a calculating device to find a distance to the object based on the integrated output voltages of the integrating circuit.

20 Claims, 17 Drawing Sheets

FIG. 8

| X | D(m) |
|---|---|
| 0.10 | ∞ |
| 0.15 | 3.70 |
| 0.20 | 1.85 |
| 0.90 | 0.37 |

DISTANCE MEASURING DEVICE

BACKGROUND OF THE INVENTION

The invention relates to a distance measuring device for use in cameras or the like.

Various types of distance measuring devices of the light projecting and receiving type have been proposed which incorporate integrating circuits. Such devices operate by activating a light projecting circuit to emit light for a predetermined number of times or for a predetermined period of time onto an object, integrate a received light reflected by the object and perform A/D conversion of the integrated voltage to calculate a distance to the object undergoing distance measurement. Such distance measuring devices require several comparators as shown, for example, in Japanese Patent Laid-Open No. 119307/1991, to convert interterminal voltages of integrating capacitors into digital signals. In fact, the resolution of such devices is proportional to the number of comparators. Thus, to attain higher accuracy distance measurement, the distance measurement circuit becomes complex and large-scaled, which results in a high cost.

To solve foregoing problem, the assignee of the present application has proposed in Japanese Patent application No. 291342/1992 a distance measuring device in which a pulsed light is irradiated onto an object undergoing distance measurement, light reflected by the object is integrated by two light receiving circuits for long and short distance ranges of the entire measurable distance range until the integrated voltage reaches a predetermined value, the number of light projections at that time is counted, and the distance to the object is calculated on the basis of two count values thus obtained by the respective light receiving circuits. However, the above-described distance measuring device does not take into account the influence of drift voltages of internal amplifiers due to temperature change. Accordingly, the drift voltages are superimposed on outputs of integrating circuits when the ambient temperature varies, which may cause degradation in distance measuring accuracy. While such drift voltages can be removed by the addition of circuitry, this results in increasing the size and complexity of the circuit and makes the distance measurement device expensive due to the addition of a special purpose circuit for the removal of drift voltages.

To solve the above-mentioned problem, the assignee of the present application has proposed in Japanese Patent application No. 320369/1992 a distance measuring device in which the accuracy of distance measurement is enhanced by estimating a drift voltage per unit time output by an amplifier of a distance measuring circuit prior to a distance measurement operation and subtracting the influence of drift voltage from a result of the distance measurement after the distance measurement operation has been performed.

However, in the above-described distance measuring device, the influence of drift voltage is removed in terms of software, and detection of the drift voltage by software inevitably results in an error because it is different in sequence from the actual distance measuring operation. Thus, an improvement in accuracy of distance measurement cannot be accurately obtained. Also, since the drift voltage is added to an output of a pair of integrating circuits, such output will be made different from a designed value. In the case of using such output, there is also caused a problem of yield rate because the integrating circuits are substantially changed in dynamic range. Also, the drift voltages superimposed on an output of the integrating circuits include not only the drift voltage of an amplifier different from the integrating circuits but also drift voltages of the integrating circuits themselves. Conventionally, both such drift voltages have not been removed in terms of circuitry.

SUMMARY OF THE INVENTION

To solve the above-mentioned problems, the present invention provides a distance measuring device comprising light projecting means for irradiating light onto an object undergoing distance measurement, light receiving means for receiving light, reflected by the object and generating two outputs varying in value depending upon a position of received light, an amplifier for amplifying the two outputs on the basis of a reference voltage, a regulating circuit for regulating the reference voltage, an integrating circuit for integrating two outputs of the amplifier separately, and calculating means for finding a distance to the object making use of the two outputs thus integrated, wherein the regulating circuit regulates the reference voltage on the basis of offset voltages the amplifier and the integrating circuit. Accordingly, offset voltages of the amplifier and the integrating circuit can be canceled on the basis of an output of the integrating circuit to achieve enhancement of accuracy in distance measurement. Also, since offset voltages of the amplifier and the integrating circuit can be canceled on the basis of an output of the integrating circuit, an output of the integrating circuit becomes stable and an improvement in yield is attained.

Also, the device preferably further comprises a storage circuit for storing a value conformed to offset voltages of the amplifier and the integrating circuit, and the regulating circuit preferably regulates the reference voltage on the basis of offset voltages of the amplifier and the integrating circuit stored in the storage circuit, so that the device can be made simple in operation because detection of a value conformed to offset voltages of the amplifier and the integrating circuit every time is dispensed with by storing at one time the value conformed to offset voltages of the amplifier and the integrating circuit in the storage circuit and regulating a reference voltage in accordance with the stored value.

The regulating circuit may comprise an analog voltage output circuit, regulating resistors and a switching element, and use the analog voltage output circuit and the regulating resistors to generate a regulating voltage to output the same to the amplifier via the switching element.

Further, offset voltages of the amplifier and the integrating circuit may be based on an output of the integrating circuit when the light projecting means does not operate.

Prior to distance measurement, the regulating circuit regulates a reference voltage on the basis of offset voltages of the amplifier and the integrating circuit, whereby offset voltages of the amplifier and the integrating circuit, which are contained in an output of the integrating circuit, can be cancelled, so that it becomes possible to enhance accuracy in distance measurement performed by the calculating means.

BRIEF DESCRIPTION OF THE DRAWINGS

FIG. 8 is a table on a ROM for finding a distance D on the basis of a value X in the embodiment;

DESCRIPTION OF THE PREFERRED EMBODIMENTS

Figure 1:
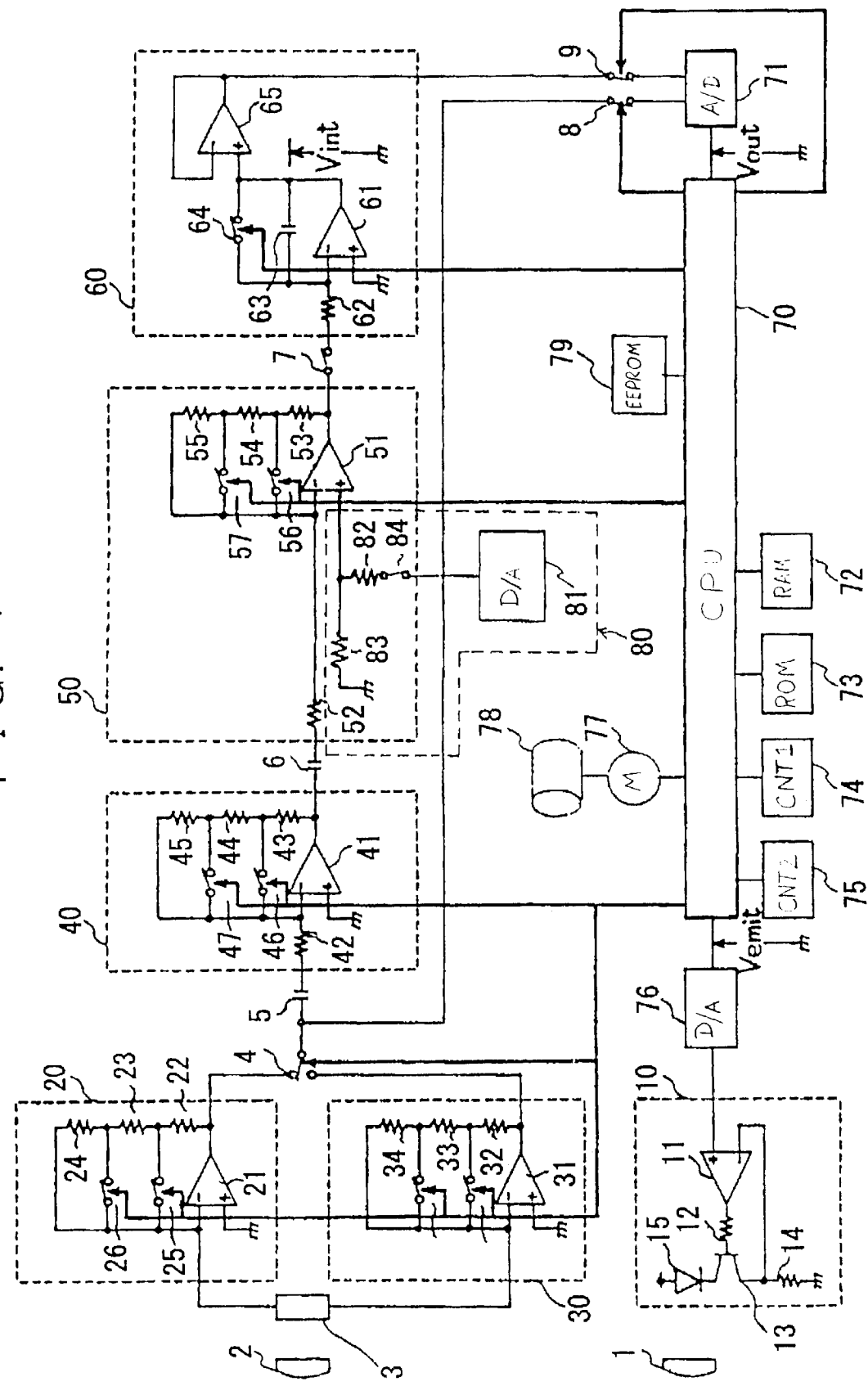
FIG. 1 is a circuit diagram showing an embodiment of the present invention.

A construction of an embodiment of the invention will be explained with reference to FIG. 1. A distance measuring device according to the invention is one making use of the principle of trigonometrical distance measuring. In the inventive device, light projected from a light projecting means 10 is irradiated onto an object undergoing distance measurement (not shown) located at either a far or near position in a measurable range of the device, and the reflected light is received by a light receiving element 3. A position on the light receiving element 3 where the reflected light is received is very near a center of the light receiving element 3 where the object is positioned far from the device (e.g., at infinity), and is gradually shifted to one side measured by a near-side current/voltage converting circuit 30 (downward in FIG. 1) from the center of the light receiving element as the object comes closer to the projecting means. The received light is gradually shifted to an opposite side of the light receiving element 3 measured by a far-side current/voltage converting circuit 20 (upward in FIG. 1) from the center of the light receiving element 3 as the object moves farther from the light projecting means. Light received by the light receiving element 3 generates in the far-side current/voltage converting circuit 20 and the near-side current/voltage converting circuit 30 two outputs varying in value depending upon the position of received light, and outputs of the both are made use of to provide measurement of a distance to the object undergoing distance measurement.

The circuit construction will now be explained in more detail. The light projecting means 10 comprises a constant current circuit for driving a light projecting element 15 comprising an infrared light emitting element (referred to below to as an IRED), and is composed of an amplifier 11, a base resistor 12, a transistor 13, and a sensing resistor 14. The sensing resistor 14 is used to detect a current flowing through the IRED 15, and an interterminal voltage is input into an inverting input terminal of the amplifier 11 to undergo current feedback. Accordingly, the IRED 15 is driven at a constant current by a current proportional to a voltage output from a D/A converter 76. Actually, as the D/A converter 76 outputs voltage intermittently, the IRED 15 is pulse driven.

The far-side current/voltage converting circuit 20 and the near-side current/voltage converting circuit 30 are made integral with the light receiving element 3 comprising a Position Sensitive Device (referred to below to as a "PSD"). When a light signal is incident on the PSD 3, current depending upon its intensity and an incident position is output to the far-side current/voltage converting circuit 20 and the near-side current/voltage converting circuit 30 by the PSD 3. Since the far-side current/voltage converting circuit 20 and the near-side current/voltage converting circuit 30 have the same construction, an explanation will be given of only the far-side current/voltage converting circuit 20. The far-side current/voltage converting circuit 20 comprises an amplifier 21 and three feedback resistors 22, 23 and 24 and outputs a voltage proportional to an input current. The circuit includes a switch 25 and a switch 26, and the ON/OFF state of these switches can be controlled by a CPU 70. As the switch 25 turns feedback resistors 23 and 24 ON/OFF and the switch 26 turns a feedback resistor 24 ON/OFF, the amplifier 21 varies in gain in a stepwise manner in accordance with the state of these switches. Accordingly, conversion of a signal current into a voltage is effected in accordance with the varied gain. Similarly, the near-side current/voltage converting circuit 30 has an amplifier 31 functioning in the same manner as the amplifier 21, three feedback resistors 32, 33 and 34 functioning in the same manner as the feedback resistors 22, 23 and 24, and two switches that function in the same manner as switches 25 and 26. The output voltage is input to a switch 4. Having gone through the same process as described above, a voltage in accordance with the signal current is output from the near-side current/voltage converting circuit 30 to be input to the switch 4. The switch 4 serves to transmit an output of either the far-side current/voltage converting circuit 20 or the near-side current/voltage converting circuit 30 to a circuit in the subsequent stage, and its state is controlled by the CPU 70. When distance measurement is effected on the far-side, the switch 4 is turned ON toward the far-side current/voltage converting circuit 20 and when distance measurement is effected on the near-side, it is turned ON toward the near-side current/voltage converting circuit 30.

As an amplifier 40 and an amplifier 50 are of substantially the same construction, an explanation will be given to the amplifier 40 with respect to its main part. A coupling capacitor 5 is connected ahead of the amplifier 40 and a DC component of an input signal is eliminated by the capacitor. The amplifier 40 comprises an amplifier 41 and three feedback resistors 43, 44, 45 and amplifies an input signal with a certain gain. The amplifier includes a switch 46 and a switch 47, and the CPU 70 can control the ON/OFF state of these switches. As the switch 46 turns the feedback resistors 44 and 45 ON/OFF and the switch 47 turns the feedback resistor 45 ON/OFF, the amplifier 41 varies in gain in a stepwise manner in accordance with the state of these switches. Accordingly, conversion of a signal current into a voltage is effected in accordance with the varied gain, and is output to a circuit in the subsequent stage. The amplifier 50 operates in the same manner as the amplifier 40, the CPU 70 operates a switch 56 and a switch 57 to set an appropriate gain, and a signal output from the amplifier 40 is correspondingly amplified. An output signal of the amplifier 50 is output to an integrating circuit 60 in the subsequent stage via a switch 7.

A regulating circuit 80 serves to cancel an offset voltage of the amplifier 50 and backward (or upstream circuitry) to regulate a reference voltage of the amplifier 50. More specifically, the circuit contains an analog voltage output circuit 81, regulating resistors 82, 83 and a switching element 84, and uses the analog voltage output circuit 81 and regulating resistors 82, 83 to generate a regulated voltage to output the same to the amplifier 50 via the switching element 84. In this example, the analog voltage output circuit 81 is a D/A converter 81 to vary an analog voltage to output the same. The switching element 84 is an offset regulating switch 84. A value corresponding to the regulated voltage output from the regulating circuit 80 is stored in a storage circuit 79 such as a EEPROM or the like connected to the CPU 70.

The integrating circuit 60 has an amplifier 61, an input resistor 62, an integrating capacitor 63, and a switch 64 for discharging the integrating capacitor 63, and a voltage follower 65. Prior to an integrating control action (e.g., an action causing the integration to commence), the switch 64 is turned ON to discharge electric charge remaining in the integrating capacitor 63. When discharge has been fully effected, the switch 64 is turned OFF. When the integrating control action is started upon the turning ON of the switch 7, a time-integrated value of an input signal is stored in the integrating capacitor 63. When the integrating control action is terminated, the switch 7 is turned OFF and an interterminal voltage of the integrating capacitor 63 is output to the voltage follower 65. At this time, the switch 9 is also turned ON, and an output of the voltage follower 65 is taken into an A/D converter 71. The A/D converter 71 converts the output into a digital voltage to output the same to the CPU 70.

Subsequently, an explanation will be given of the operation of the circuit. First, an explanation will be given of the operation of determination of an offset regulating value with reference to FIGS. 15 and 16. With the projecting means 10 first put in a non-operating state, an output voltage Va of the D/A converter 81 shown in FIG. 1 is set to a central value (initial value) in design, of a reference voltage of the amplifier 50 (#601). Then the offset regulating switch 84 is turned ON (#602) to measure an offset value Vd (#603). This measurement will be explained later in detail with reference to FIG. 12. As shown in FIG. 16, the switch 64 is turned ON to permit electric charge accumulated in the integrating capacitor 63 to be discharged, and is then turned OFF. After the lapse of a time T4, the switch 7 is turned ON and turned OFF after the lapse of a time T5. Then the switch 9 is turned ON, so the A/D converter 71 performs A/D conversion of Vint as input, which is read by the CPU 70. Vint having undergone A/D conversion is divided by the time T5 to provide an offset value Vd. Judging a sign (flag f) of the offset value Vd (#604), f=0 is assumed when the offset value is plus, and f=1 is assumed when the offset value is minus. As Vd is plus as seen from the initial Vint in FIG. 16, f=0 results, and judgment of flag is again carried out (#607) by setting an output voltage Va as (Va−1) (#605) and measuring the offset value Vd (#606) in the same manner as described above. When f=0 at this time, the procedure is repeated from #605. This state is as shown by Vint in FIG. 16, and the offset value Vd decreases gradually to become a very small value like the fourth Vint in the figure. Finally at the fifth Vint, the offset value is reversed to become minus, resulting in f=1. The value of the offset voltage Va at this time is stored in the storage circuit 79 (#608). When the offset value is minus in the previous #604, the output voltage Va is set to (Va+1) (#609), the offset value Vd is measured (#610) in the same manner as described above to again perform judgment of flag (#611). When f=1 at this time, the procedure is repeated from #609. The offset value Vd increases gradually to be finally reversed to make the offset value plus, resulting in f=0. Va at this time is stored in the storage circuit 79 (#608). Thereby, the offset voltage of the amplifier 50 and circuitry thereafter (or downstream) is cancelled. This action solves a problem in that when the offset value on a plus side increases, the autofocus ("AF") accuracy degrades, for example, and when the offset value on a minus side increases, the performance on an AF far side cannot be ensured.

Subsequently, the distance measuring operation is started when a release button (not shown) is depressed. The CPU 70 first turns ON an electric source power for all the circuits shown in FIG. 1. Then contents of a random access memory 72 (referred below to as "RAM") are cleared, and an offset regulating value Va stored in the storage circuit 79 is set in the D/A converter 81, the offset regulating switch 84 is turned ON. Then the far-side current/voltage converting circuit 20 and the near-side current/voltage converting circuit 30 are determined with respect to gain. At this time, in the case where even if gain is set to a minimum, luminance of an object undergoing distance measurement is great to make the amplifier saturate, the depth of field becomes adequately large, so that the infinite flag in the RAM 72 is set to provide judgment of infinity. Further, the amplifier 40 and the amplifier 50 are determined with respect to gain. At this time, in the case where even if gain is set to a minimum, luminance of an object being distance measured is great enough to make the amplifier saturate, the close flag in the RAM 72 is set to provide judgment of vicinity without any distance measurement. Then the drift voltage Vd per unit time of projection is determined for the circuit prior to the distance measurement.

Thereafter, the CPU 70 pulse drives the projecting means 10 and uses the far-side current/voltage converting circuit 20, while counting the number of projections with the counter (CNT1) 74, to current/voltage convert an output current of the light receiving element at that time to amplify the same in the amplifiers 40, 50 for integration in the integrating circuit 60. When the integrated voltage reaches Vth3, the CPU 70 terminates projection to store in the RAM 72 the number of times K1 of projection output from the counter 74. In the case where the number of times of projection reaches Nlim before the integrated voltage reaches Vth3, judgment of infinity is given to set the infinite flag in the RAM 72. Then the CPU 70 pulse drives the projecting circuit and uses the near-side current/voltage converting circuit 30, while counting the number of times of projection with the counter (CNT2) 75, to current/voltage convert an output current of the light receiving element 3 at that time to amplify the same in the amplifiers for integration in the integrating circuit. When the integrated voltage reaches Vth3, the CPU 70 terminates projection to store in the RAM 72 the number of times K2 of projection output from the counter. When the operation of projection is terminated, infinity is given in the case of the infinite flag being set, and vicinity is given in the case of the close flag being set. In the case of neither infinity nor vicinity, the following value X is calculated from both the number of times N1 obtained by multiplying the number of times K1 stored in the RAM 72 by a correction corresponding to Vd and the number of times N2 obtained by multiplying the number of times K2 stored in the RAM 72 by a correction corresponding to Vd.

$$X=N1/(N1+N2) \qquad (a)$$

When the value X is determined by the formula (a), reference is made to a predetermined address matching the value X, in a read only memory 73 (referred below to as "ROM") (see FIG. 8) to find a distance D to an object undergoing distance measurement, according to results of which a motor (M) 77 is energized to drive a lens body tube 78. Finally, the electric power source for the distance measurement circuit is turned OFF to exit this routine.

Figure 2:
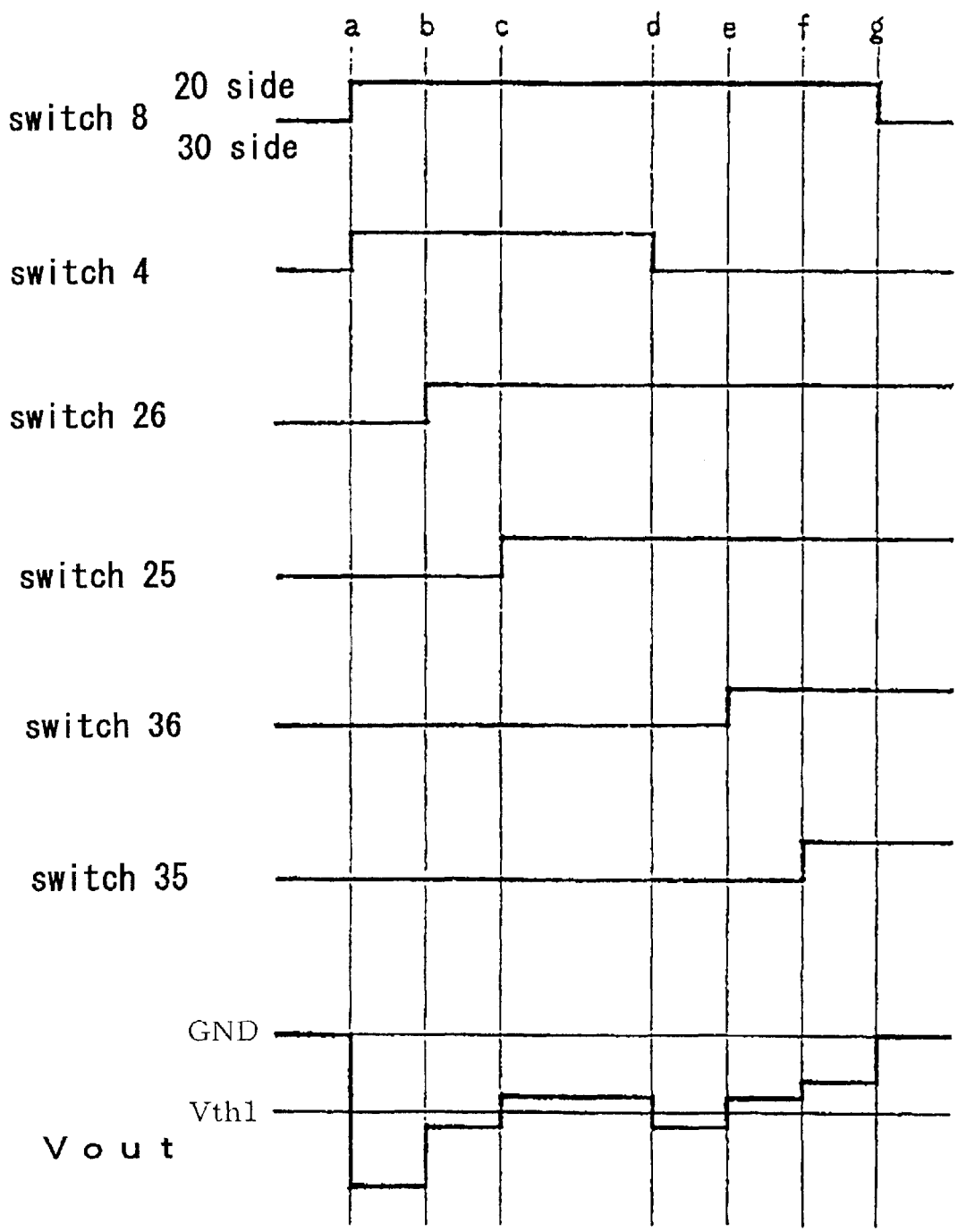
FIG. 2 is a view illustrating a method of determining gains of a far-side current/voltage converting circuit 20 and a near-side current/voltage converting circuit 30 in the embodiment.

Among the above-mentioned operations, the operation of determining gains of the far-side current/voltage converting circuit 20 and the near-side current/voltage converting circuit 30 will be explained below in detail with reference to FIG. 2. First, the switch 4 is turned ON toward the far-side current/voltage converting circuit 20 and the switch 8 is turned ON whereby an output of the far-side current/voltage converting circuit 20 is input into the A/D converter 71 (FIG. 2 at "a"). Since the far-side current/voltage converting circuit 20 performs a negative or inverse amplification operation, an output voltage Vout of the A/D converter 71 is below a ground level. The CPU 70 reads Vout to compare the same with Vth1 (for example, −0.5 V) to turn the switch 26 ON when Vout is lower than the latter, thus providing a decrease in gain. Vout is further once more taken in (FIG. 2 at "b") to be compared with Vth1, the switch 25 is turned ON when Vout is lower than the latter, thus providing a decrease in gain (FIG. 2 at "c"). Thus, an optimum gain of the far-side current/voltage converting circuit 20 is determined. Then the switch 4 is turned ON toward the near-side current/voltage converting circuit 30 whereby an output of the near-side current/voltage converting circuit 30 is input into the A/D converter 71 (FIG. 2 at "d"). As in the case with the far-side current/voltage converting circuit 20, the CPU 70 reads Vout of the A/D converter 71 for comparison, and turns the switch 36 ON when Vout is lower than Vth1 (FIG. 2 at "e"). Vout is read once more in that state, then Vth1 becomes higher than Vout, which means that the near-side current/voltage converting circuit 30 has reached an optimum gain.

In the case of comparing the far-side current/voltage converting circuit 20 and the near-side current/voltage converting circuit 30 with each other, however, the far-side current/voltage converting circuit 20 is larger in gain than the latter, so that the light receiving circuit lacks symmetry as a whole. Accordingly, the switch 35 of the near-side current/voltage converting circuit 30 is turned ON (FIG. 2 at "f") in order to conform to the far-side current/voltage converting circuit 20, the gain of which is smaller among the both circuits. Thus the light receiving circuit is determined in gain as a whole. Finally, the switch 8 is turned OFF to terminate the operation of determining gain of the current/voltage converting circuits. Hereupon, while an object undergoing distance measurement, having a luminance to some degree can be met with the above-mentioned procedure of determination of gain, it is conceivable that in the case of an object undergoing distance measurement, having a very great luminance, the amplifier will still saturate even if two switches contained in the respective current/voltage converting circuits are turned ON. In this case, because the depth of field is made very large by setting a value of an aperture opening at the time of photographing to a minimum, judgment of infinity is substantially justifiable. Accordingly, the infinite flag is set in such case to terminate the operation.

Figure 3:
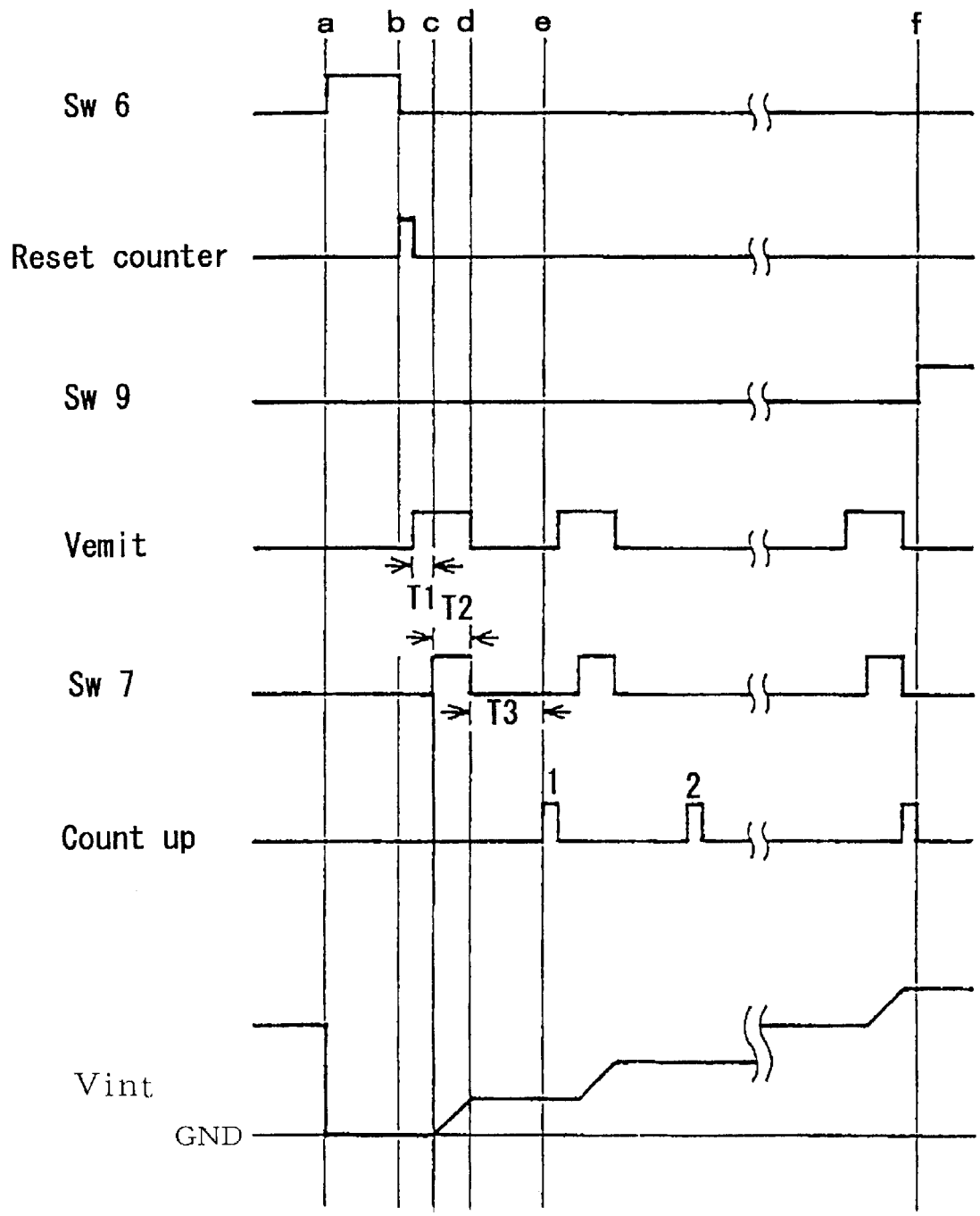
FIG. 3 is a view illustrating the integrating operation in the embodiment.

Subsequently, an explanation will be given below in detail of the operation of gain determination of the amplifiers 40, 50 with reference to FIGS. 3 and 4. First, the CPU 70 turns the switch 4 ON toward the far-side current/voltage converting circuit 20 and turns the switch 9 OFF. The switch 64 is turned ON to permit electric charge accumulated in the integrating capacitor 63 to be discharged (FIG. 3 at "a"). After electric charge is fully discharged, the switch 64 is turned OFF and the counter 74 is cleared to zero (FIG. 3 at "b"). Thereafter, the CPU 70 actuates the projecting circuit 10 to start projection. In order to ensure rise time for the respective amplifiers and mitigate influences associated with fluctuation of the electric source accompanying the startup of projection, the switch 7 is closed after the lapse of a time T1 of projection (FIG. 3 at "c") to actuate the integrating circuit for a time T2, and then the switch 7 is opened (FIG. 3 at "d"). When the procedure is terminated, projection and integration are stopped to wait for a time T3, thus adding 1 to the counter (FIG. 3 at "e").

Figure 4:
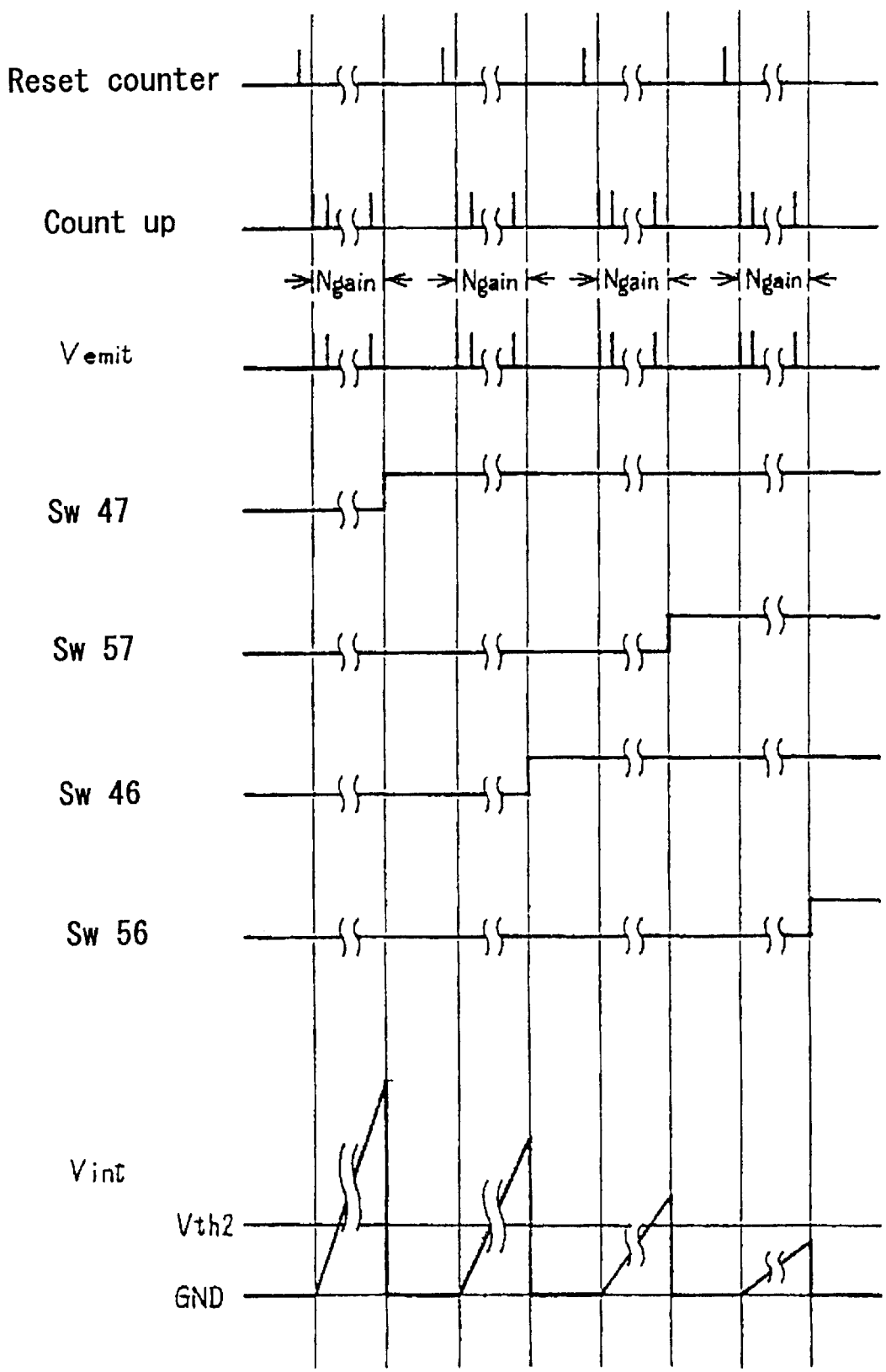
FIG. 4 is a view illustrating a method of determining gains of amplifiers 40 and 50.

As shown in FIG. 4, after the above-mentioned operation is repeated for a predetermined number of times Ngain (for example, 10 times), the switch 9 is turned ON to output to the A/D converter 71 an interterminal voltage of the integrating capacitor 63, that is, an integrating voltage Vint (FIG. 3 at "f"), and the A/D converter 71 digital converts the voltage to output the same to the CPU 70. The CPU 70 compares Vint with Vth2 (for example, 0.5 V) and turns the switch 47 ON when Vint is greater than the latter. The integrating operation and the comparative calculation are then repeated in the same manner as described above, the switches 57, 46 and 56 are turned ON in this order when Vint is greater than Vth2. In this manner, gains of the amplifiers are determined as a whole. If Vint is still greater than Vth2 even when all the switches are turned ON in accordance with the above-mentioned procedure, setting the vicinity flag judging that an object undergoing distance measurement is located in the vicinity terminates the operation.

Figure 6:
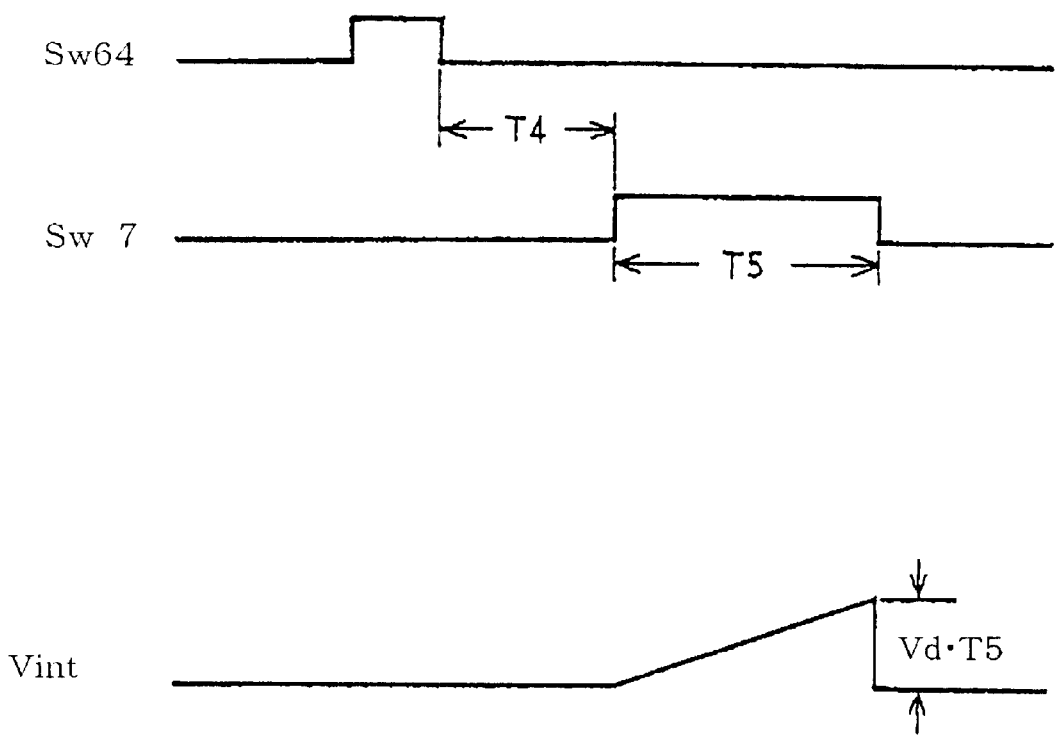
FIG. 6 is a view illustrating a method of calculating an offset in the embodiment.

Subsequently, an explanation will be given below in detail of the manner of finding a drift voltage per unit time of projection with reference to FIG. 6. First, the switch 64 is turned ON to permit electric charge accumulated in the integrating capacitor 63 to be discharged. After electric charge is fully discharged, the switch 64 is turned OFF and the switch 4 is turned ON toward the far-side current/voltage converting circuit 20, the switches 7, 8 and 9 being turned OFF. Then the operation is placed in a standby mode for a time T4. Subsequently, the projecting circuit 10 is not driven, but the switch 7 is turned ON to start the integrating operation to wait for a time T5. During this time, based on the drift voltage of the circuit electric charge is charged in the integrating capacitor 63. Thereafter, the integrating operations are terminated, and a drift voltage Vd per unit time of projection is found in accordance with the following formula. It is conceivable that Vd may be plus or minus.

$$Vd=Vint \cdot T2/T5 \qquad (b)$$

Figure 7:
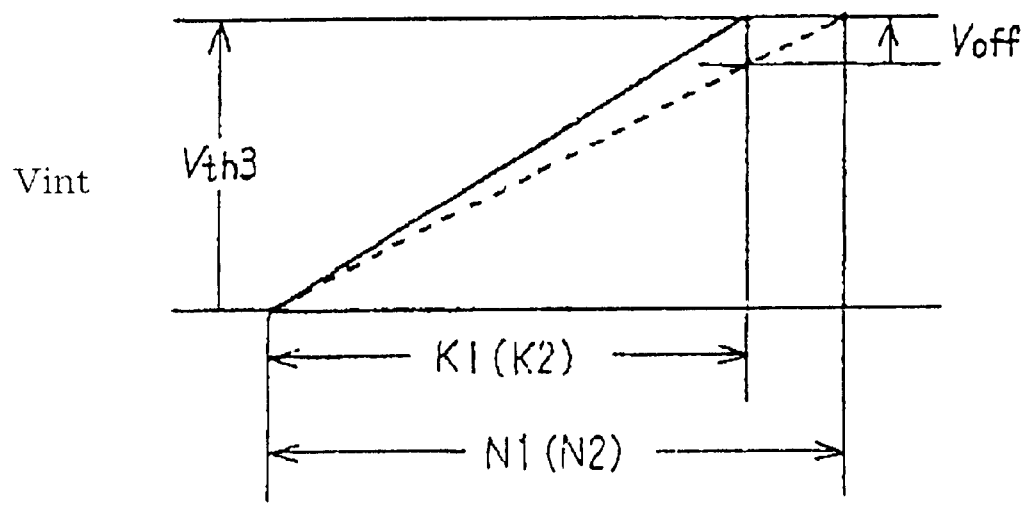
FIG. 7 is a view illustrating a method of calculating N1 and N2 in the embodiment.

Subsequently, an explanation will be given below in detail to the manner of using the far-side current/voltage converting circuit 20 to perform distance measurement and find the number of times N1 with reference to FIGS. 3 and 7. First, the switch 64 is turned ON to permit electric charge accumulated in the integrating capacitor 63 to be discharged. After electric charge is fully discharged, the switch 64 is turned OFF and the contents of the counter CNT1 74 are cleared to zero.

Subsequently, operation passes into the operation of distance measurement. The manner of distance measurement is performed as shown in FIG. 3. While projection is repeated, addition is made in the counter CNT1 74. At the time when Vint reaches a predetermined voltage Vth3, the operation is terminated. In the case where Vint does not reach Vth3 even when projection is carried out a predetermined maximum number of times Nlim because a distance to an object undergoing distance measurement is too great, judgment of infinity is given to set the infinite flag in the RAM 72, thus terminating the operation. Except in the above case, the following calculation is performed at the time of termination of distance measurement in order to remove influences of the drift voltage from the times K1 remaining in the counter 74.

An explanation will be given to a method of calculation if the drift voltage were of positive polarity, with reference to FIG. 7. While an interterminal voltage of the integrating capacitor has reached Vth3 at the completion of distance measurement, it contains a drift voltage Voff, and thus distance measurement must have been completed in a smaller number of projections for the case without any drift voltage. If there were not any drift voltage, projection would have to be carried out the number of times N1 shown in FIG. 7. The number of times N1 is represented in the following manner with the use of the number of times K1, Vth3 and Voff.

$$N1 = K1 \cdot Vth3 / (Vth3 - Voff) \tag{c}$$

Here, Voff is represented with the use of a drift voltage Vd per unit time of projection.

$$Voff = K1 \cdot Vd \tag{d}$$

Accordingly, the number of times N1 can be calculated by eliminating Voff from the formulae (c) and (d).

$$N1 = K1 \cdot Vth3 / (Vth3 - K1 \cdot Vd) \tag{e}$$

The above number of times N1 is stored in the RAM 72. In the above example, the method of calculation in the case of the drift voltage being of positive polarity while calculation is performed in the same manner as described above for the case of the drift voltage being of negative polarity except that Voff is made negative.

Subsequently, an explanation will be given below of the manner of using the near-side current/voltage converting circuit 30 to perform distance measurement and find the number of times N2 with reference to FIGS. 3 and 7. First, the switch 64 is turned ON to permit electric charge accumulated in the integrating capacitor 63 to be discharged. After electric charge is fully discharged, the switch 64 is turned OFF. In addition, the contents of the counter 75 are cleared to zero. Subsequently, operation passes into the operation of distance measurement. The manner of distance measurement is performed as shown in FIG. 3. While projection is repeated, addition is made in the counter 75. At the time when Vint reaches a predetermined Vth3, the operation is terminated. At the time of termination of distance measurement, the number of times K2 remaining in the counter 75 is used to calculate the following number of times N2 in the same method of calculation as for the case with the number of times N1 to store the same in the RAM 72.

$$N2 = K2 \cdot Vth3 / (Vth3 - K2 \cdot Vd) \tag{f}$$

Figure 5:
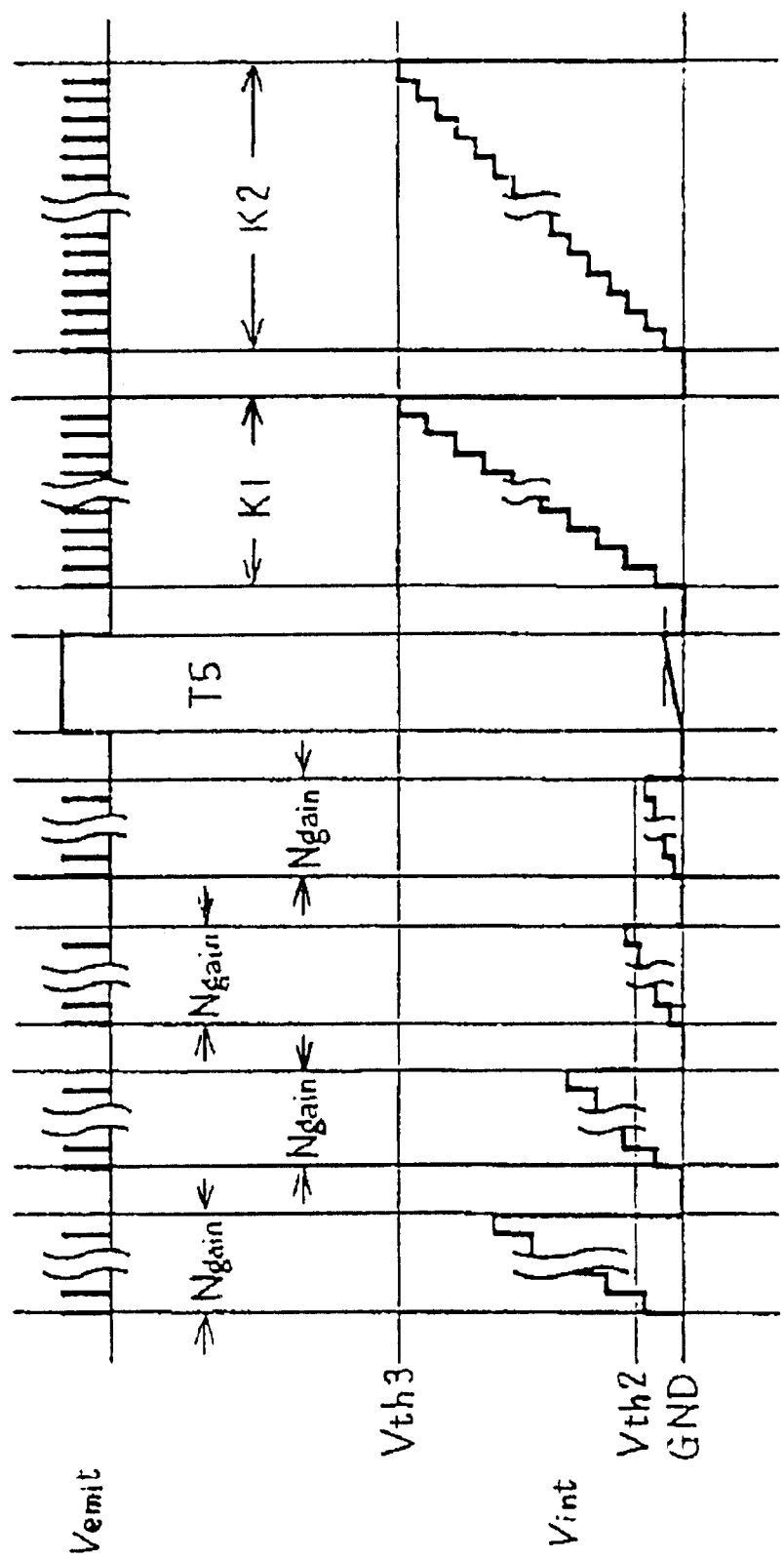
FIG. 5 is a view illustrating a series of operations at the time of distance measurement.

The operation of the circuits in the embodiment is as described above. FIG. 5 graphically shows the process from the determination of gain of the amplifier in the subsequent stage to the distance measurement performed by the near-side current/voltage converting circuit 30. FIGS. 9 to 14 show a flowchart of the above operation. First, a main routine will be explained with reference to FIG. 9.

Figure 8:
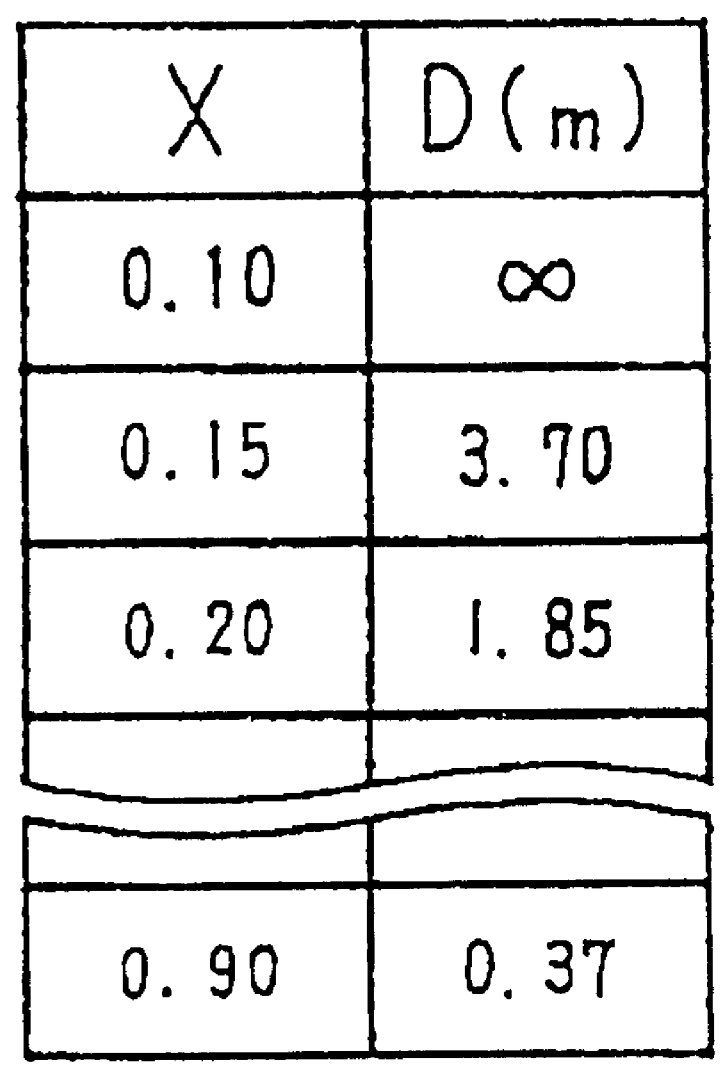

When it comes into the routine of distance measurement, the CPU 70 turns ON an electric source for the distance measuring circuit (#001), subsequently clears contents of the RAM 72 (#002), sets in the D/A converter 81 an offset regulating value Va stored in the storage circuit 79 (#003), and turns ON the offset regulating switch 84 (#004). Then, gains of the far-side current/voltage converting circuit 20 and the near-side current/voltage converting circuit 30 are determined (#005), the state of infinite flag is confirmed (#006), and the operation is made to jump to #014 when the infinite flag is set. Subsequently, gains of the amplifier 40 and the amplifier 50 are determined (#007), the state of vicinity flag is confirmed (#008), and the operation is made to jump to #014 when the vicinity flag is set. Then the drift voltage is determined (#009). Then distance measurement is carried out in the far-side current/voltage converting circuit 20 to calculate the number of times N1 to store the same in the RAM 72 (#010), the state of infinite flag is confirmed (#011), and the operation is made to jump to #014 when the infinite flag is set. Likewise, distance measurement is carried out in the near-side current/voltage converting circuit 30 to calculate the number of times N2 to store the same in the RAM 72 (#012). Subsequently, the operation in the subroutines #010 and #012 read the number of times N1 and the number of times N2 stored in the RAM 72 to calculate a value X (#013). Infinity is determined in the case of the infinite flag being set, and vicinity (closest measurable range) is determined in the case of the close flag being set. Except in those cases, a distance D to an object undergoing distance measurement is found (#014) and the body tube 78 is driven (#015) by the motor 77 by making reference to a predetermined address in the ROM 73 with the value X being an offset value (FIG. 8). Finally, the electric source of the distance measuring circuit is turned OFF (#016), and the operation leaves the routine.

Subsequently, an explanation will be given to the operation in the respective subroutines. First, the subroutine for determination of gains of the current/voltage converting circuits will be explained with reference to FIG. 10. When the subroutine for determination of gains of the current/voltage converting circuits is called, the CPU 70 clears the counter 74 to zero (#101), turns the switch 4 ON toward the far-side current/voltage converting circuit 20, turns the switch 7 ON, and turns OFF all the other switches (#102). At this time, the amplifier 21 has become maximum in gain. The A/D converter 71 converts Vout of the far-side current/voltage converting circuit 20 into a digital value to output the same to the CPU 70 (#103), and the CPU 70 compares Vout with Vth1 (for example, 0.5 V) of the A/D converter 71 to jump to #110 (#104) when Vout is greater than the latter.

Subsequently, the state of the switch 26 is confirmed (#105), the switch 26 is switched over to ON to decrease gain of the amplifier 21 when the switch 26 is OFF (#106), 1 is added to the counter 74 (#109), and the operation is made to jump to #103. When the switch 26 is ON, the state of the switch 25 is confirmed, the switch 25 is switched over to ON to decrease gain of the amplifier 21 when the switch 25 is OFF (#108), 1 is added to the counter 74 (#109), and the operation is made to jump to #103. When the switch 25 is ON, the infinite flag in the RAM 72 is set (#130), and the operation leaves the routine.

Subsequently, the CPU 70 clears the counter 75 to zero (#110) and turns the switch 4 ON toward the near-side current/voltage converting circuit 30, and the A/D converter 71 converts Vout of the near-side current/voltage converting circuit 30 into a digital value to output the same to the CPU 70 (#112). The CPU 70 compares Vout with Vth1 (for example, 0.5 V) (#113) to jump to #119 when Vout is greater than the latter.

Subsequently, the state of the switch 36 is confirmed (#114), the switch 36 is switched over to ON to decrease gain of the amplifier 31 when the switch 36 is OFF (#115), 1 is added to the counter 75 (#118), and the operation is made to jump to #112. When the switch 36 is ON, the state of the switch 35 is confirmed, the switch 35 is switched over to ON to decrease gain of the amplifier 31 when the switch 35 is OFF (#117), 1 is added to the counter 75 (#118), and the operation is made to jump to #112. When the switch 35 is ON, the infinite flag in the RAM 72 is set (#130), and the operation leaves the routine.

Subsequently, a value of the number of times K1 and a value of the number of times K2 are compared with each other (#119), and when the both values are equal to each other, the operation leaves the routine. When the value of the number of times K2 is greater than the former, the operation is made to jump to #120, and when the value of the number of times K1 is greater than the latter, the operation is made to jump to #125 for respective processing.

First, when the number of times K2 is greater than the number of times K1, the state of the switch 26 is confirmed (#120), the switch 26 is switched over to ON to decrease gain of the amplifier 21 when the switch 26 is OFF (#121), 1 is added to the counter 74 (#124), and the operation is made to jump to #119. When the switch 26 is ON, the state of the switch 25 is confirmed (#122), the switch is switched over to ON to decrease gain of the amplifier 21 when the switch 25 is OFF (#123), 1 is added to the counter 74 (#124), and the operation is made to jump to #119. The switch 25 is ON, and the infinite flag in the RAM 72 is set (#130), then the operation leaves the routine.

Also, when the number of times K1 is greater than the number of times K2, the state of the switch 36 is confirmed (#125), the switch 36 is switched over to ON to decrease gain of the amplifier 31 when the switch 36 is OFF (#126), 1 is added to the counter 75 (#129), and the operation is made to jump to #119. When the switch 36 is ON, the state of the switch 35 is confirmed (#127), the switch 35 is switched over to ON to decrease gain of the amplifier 31 when the switch 35 is OFF (#128), 1 is added to the counter 75 (#129), and the operation is made to jump to #119. When the switch 25 is ON, the infinite flag in the RAM 72 is set (#130), and the operation leaves the routine.

Figure 11:
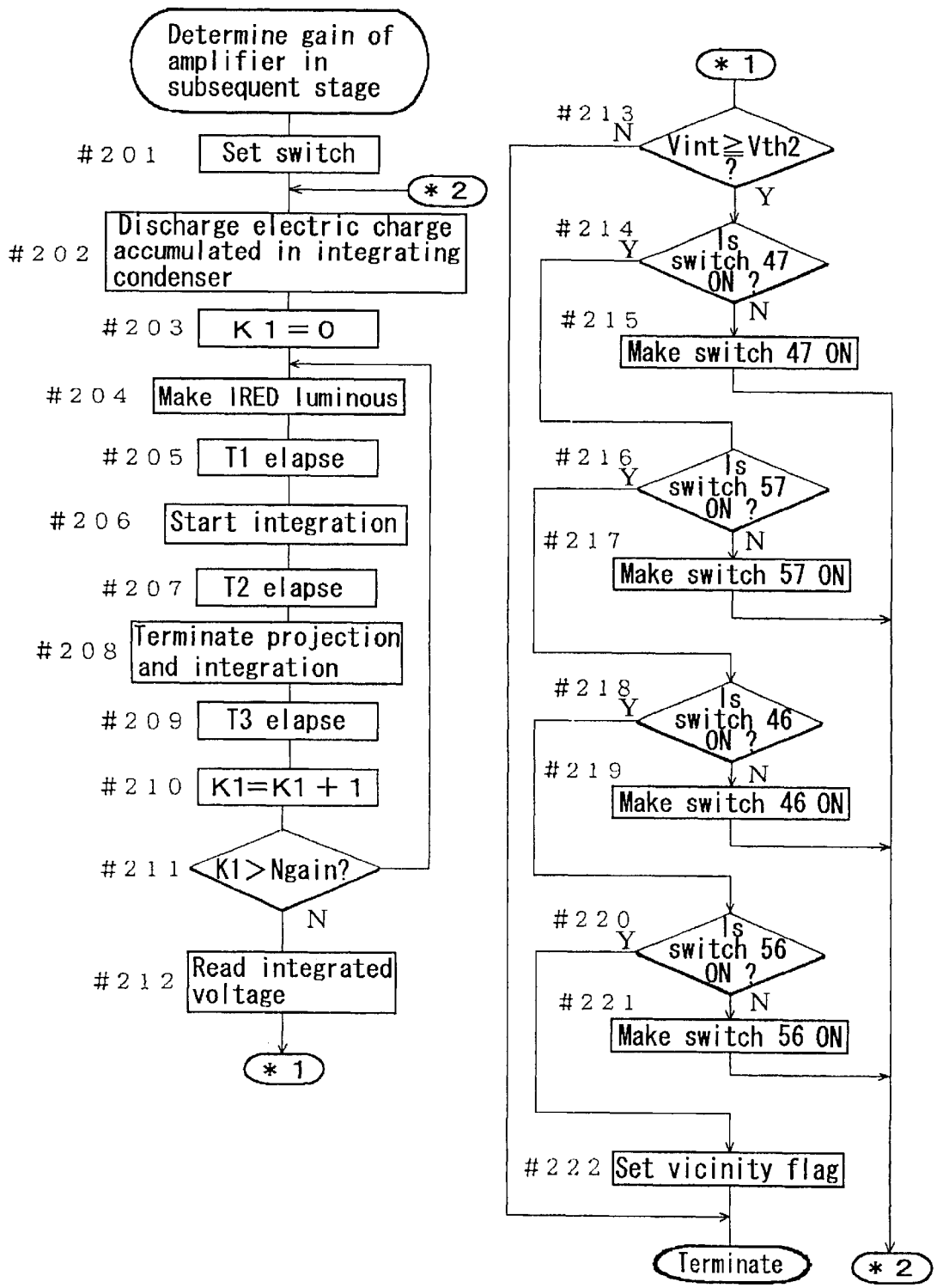
FIG. 11 is a flowchart representing a subroutine of a part for determination of gain of an amplifier in the subsequent stage in the flowchart of FIG. 9.

Subsequently, an explanation will be given to the subroutine of gain determination of the amplifiers in the subsequent stage (the amplifier 40 and the amplifier 50) with reference to FIG. 11. When the subroutine for determination of gains of the amplifiers in the subsequent stage is called, the CPU 70 turns the switch 4 ON toward the far-side current/voltage converting circuit 20, and turns the switch 9 OFF (#201). The CPU turns the switch 64 ON to permit electric charge accumulated in the integrating capacitor 63 to be discharged. After the capacitor 64 has been fully discharged, the switch 64 is turned OFF (#202). Contents of the counter 74 are cleared to zero (#203). The CPU 70 actuates the projecting circuit 10 to start projection (#204). When the CPU is initially standby for a time T1 (#205), it turns the switch 7 ON to start the integrating operation (#206). The CPU waits for a time T2 (#207), during which electric charge is accumulated in the integrating capacitor 63. After the lapse of the time T2, the CPU stops actuation of the projecting circuit 10 to terminate the projecting operation, and turns the switch 7 OFF to terminate the integrating operation (#208). After being placed in standby for a time T3, 1 is added to the counter 74 (#210). The operations of #204 to #210 are repeated until the counter 74 reaches a predetermined number of times Ngain (#211). When that is terminated, the CPU turns the switch 7 OFF and turns the switch 9 ON to output Vint to the A/D converter 71. The A/D converter 71 performs A/D conversion of the voltage to output the same to the CPU 70 (#212).

When Vint does not reach Vth2 (for example, 0.5 V) in #213, the operation leaves the routine without performing the gain operation. When Vint reaches Vth2, the gain operation is performed in the following procedure. First, the state of the switch 47 is confirmed (#214), the switch 47 is switched over to ON to decrease gain of the amplifier 41 when the switch 47 is OFF (#215), and the operation is made to jump to #202. When the switch 47 is ON, the state of the switch 57 is confirmed (#216), the switch 57 is switched over to ON (#217) to decrease gain of the amplifier 51 when the switch 57 is OFF, and the operation is made to jump to #202. When the switch 57 is ON, the state of the switch 46 is confirmed (#218), the switch 46 is switched over to ON (#219) to decrease gain of the amplifier 51 when the switch 46 is OFF, and the operation is made to jump to #202. When the switch 46 is ON, the state of the switch 56 is then confirmed (#220), the switch 56 is switched over to ON (#221) to decrease gain of the amplifier 51 when the switch 57 is OFF, and the operation is made to jump to #202. When the switch 56 is ON, the vicinity flag in the RAM 72 is set in #222, and the operation leaves the routine.

Figure 12:
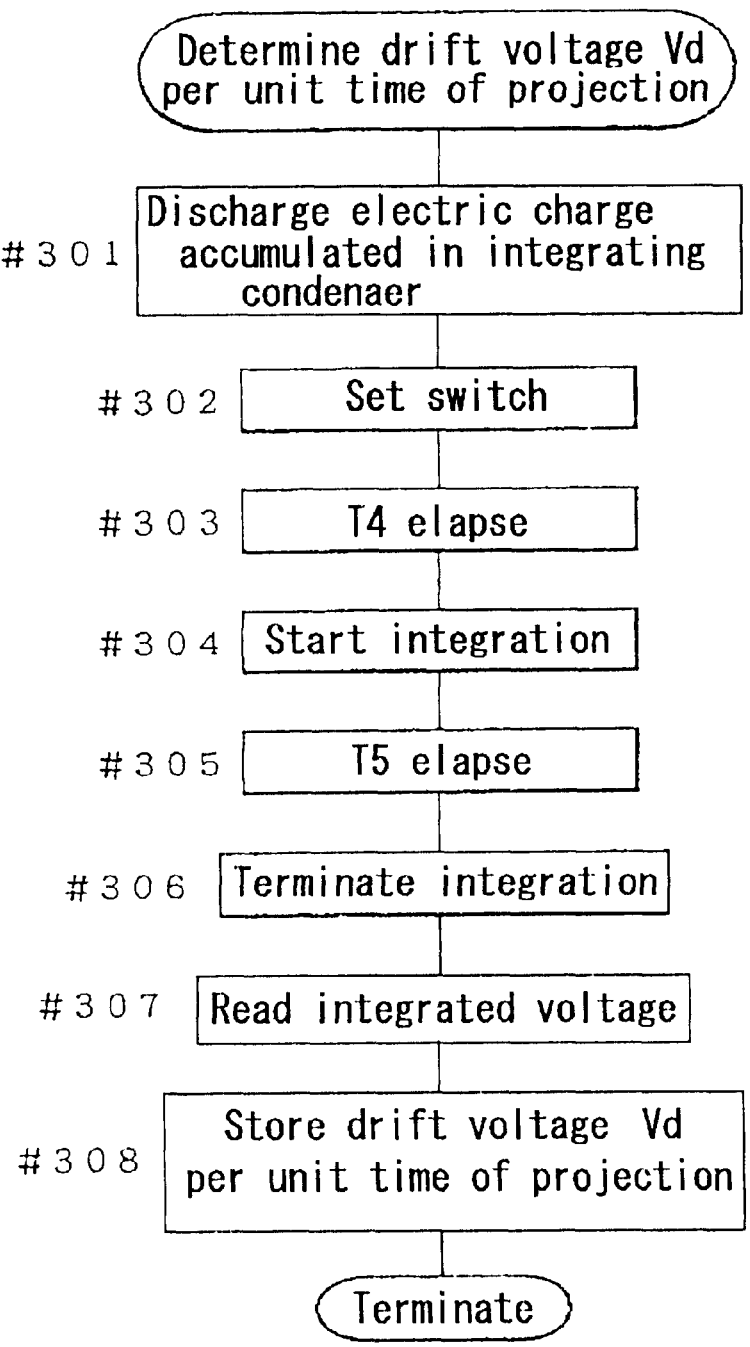
FIG. 12 is a flowchart representing a subroutine of a part for determination of a drift voltage in the flowchart of FIG. 9.

Subsequently, the subroutines for determination of a drift voltage per unit time of projection will be explained with reference to FIG. 12. When the subroutines for determination of a drift voltage per unit time of projection are called, the CPU 70 turns the switch 64 ON to permit electric charge accumulated in the integrating capacitor 63 to be discharged. After electric charge is fully discharged, the switch 64 is turned OFF (#301). Subsequently, the switch 4 is turned ON toward the far-side current/voltage converting circuit 20, and the switches 8 and 9 are turned OFF (#302). Then after being placed in standby for a time T4 (#303), the switch 7 is turned ON to start the integrating operation (#304) without driving of the projecting circuit 10, and the CPU is standby for a time T5 (#305), during which electric charge is accumulated in the integrating capacitor 63. After the lapse of the time T5, the CPU turns the switch 7 OFF to terminate the integrating operation (#306). In addition, the CPU turns the switch 9 ON, and the A/D converter 71 performs A/D conversion of the input Vint, which in turn is read by the CPU 70 (#307). The CPU 70 divides Vint (Vout) having undergone A/D conversion, by the time T5 to find a voltage Vd per unit time to output the same to the RAM 72 (#308), and leaves the subroutine.

Figure 13:
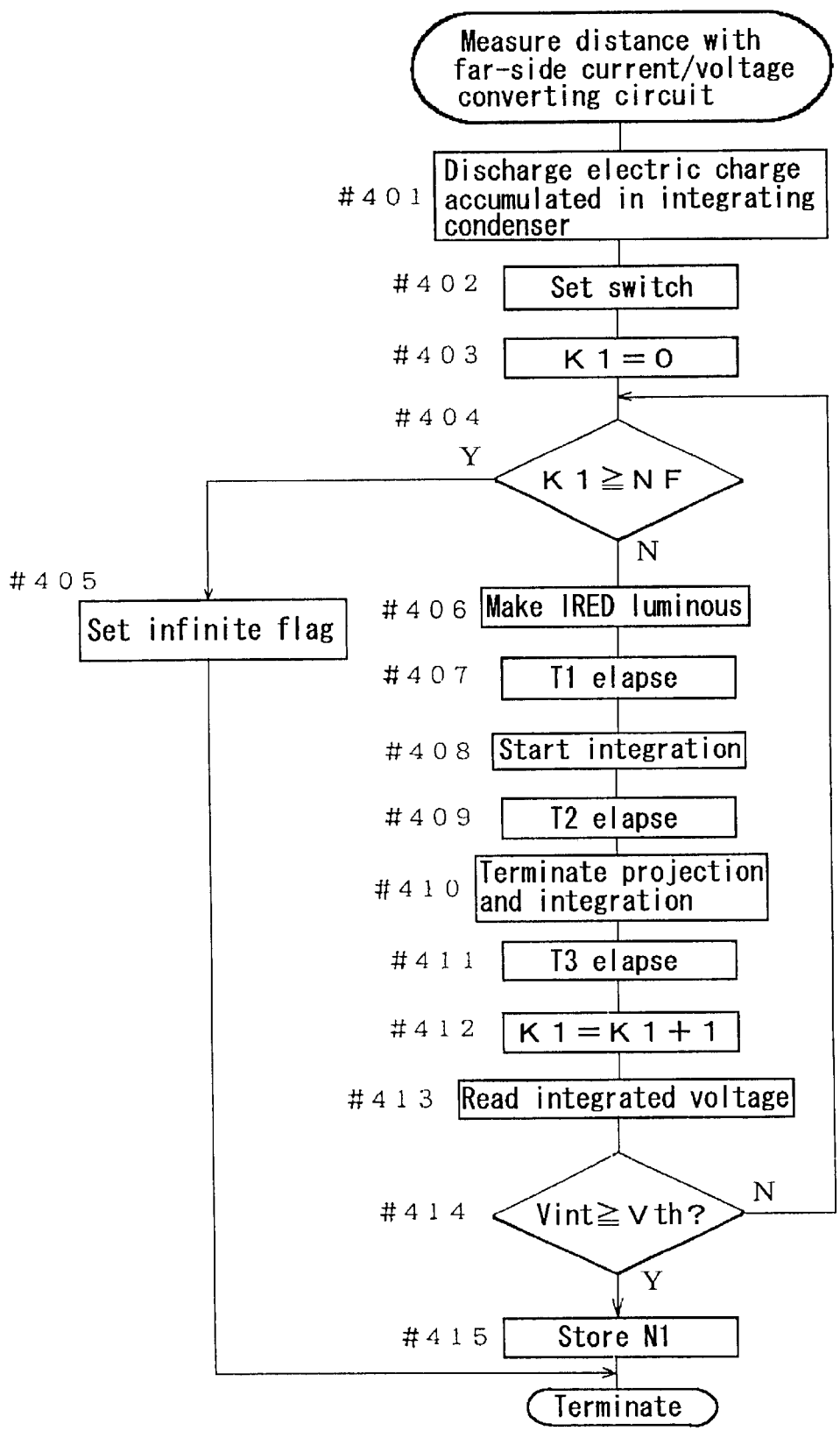
FIG. 13 is a flowchart representing a subroutine of a part for distance measurement effected by a far-side current/voltage converting circuit 20 in the flowchart of FIG. 9.

Subsequently, the subroutines for distance measurement by the far-side current/voltage converting circuit 20 will be explained with reference to FIG. 13. When the subroutines for distance measurement mode by the far-side current/voltage converting circuit 20 are called, the CPU 70 turns the switch 64 ON to permit electric charge accumulated in the integrating capacitor 63 to be discharged. After electric charge is fully discharged, the switch 64 is turned OFF (#401). Subsequently, the CPU 70 turns the switch 4 ON toward the far-side current/voltage converting circuit 20, turns the switch 7 ON, and turns the switches 8 and 9 OFF (#402). Thereafter, the counter 74 is cleared to zero (#403).

Subsequently, it passes into the operation of distance measurement. First, it is judged whether the number of times N1 is equal to or above the number of times Nlim (#404), the infinite flag in the RAM 72 is set (#405) when the former is above the number of times Nlim, and the operation leaves the routine. When the number of times N1 is below the number of times Nlim, the CPU 70 drives the projecting circuit 10 to start projection (#406). In order to ensure a rise time for the respective amplifiers and mitigate influences of fluctuation of the electric source accompanying the startup of projection, the CPU waits for a time T1 (#407), then turns the switch 7 ON to start the integrating operation (#408), and waits for a time T2 (#409), during which electric charge is accumulated in the integrating capacitor 63. After the lapse of the time T2, the CPU stops actuation of the projecting circuit 10 to terminate the projecting operation, and turns the switch 7 OFF to terminate the integrating operation (#410). After being placed in standby for a time T3 (#411), the CPU adds 1 to the counter 74 (#412), turns the switch 7 OFF and turns the switch 9 ON to output Vint to the A/D converter 71. The A/D converter 71 performs A/D conversion of the voltage to output the same to the CPU 70 (#413). The CPU 70 compares Vint with Vth3 (for example, 1.0 V) (#414) to jump to #404 for repetition of the projecting operation when Vint is smaller than Vth3. When Vint is greater than Vth3, the CPU calculates the number of times N1 on the basis of the number of times K1 in the counter 74 to store the same in the RAM 72 (#415), and leaves the subroutine.

Figure 14:
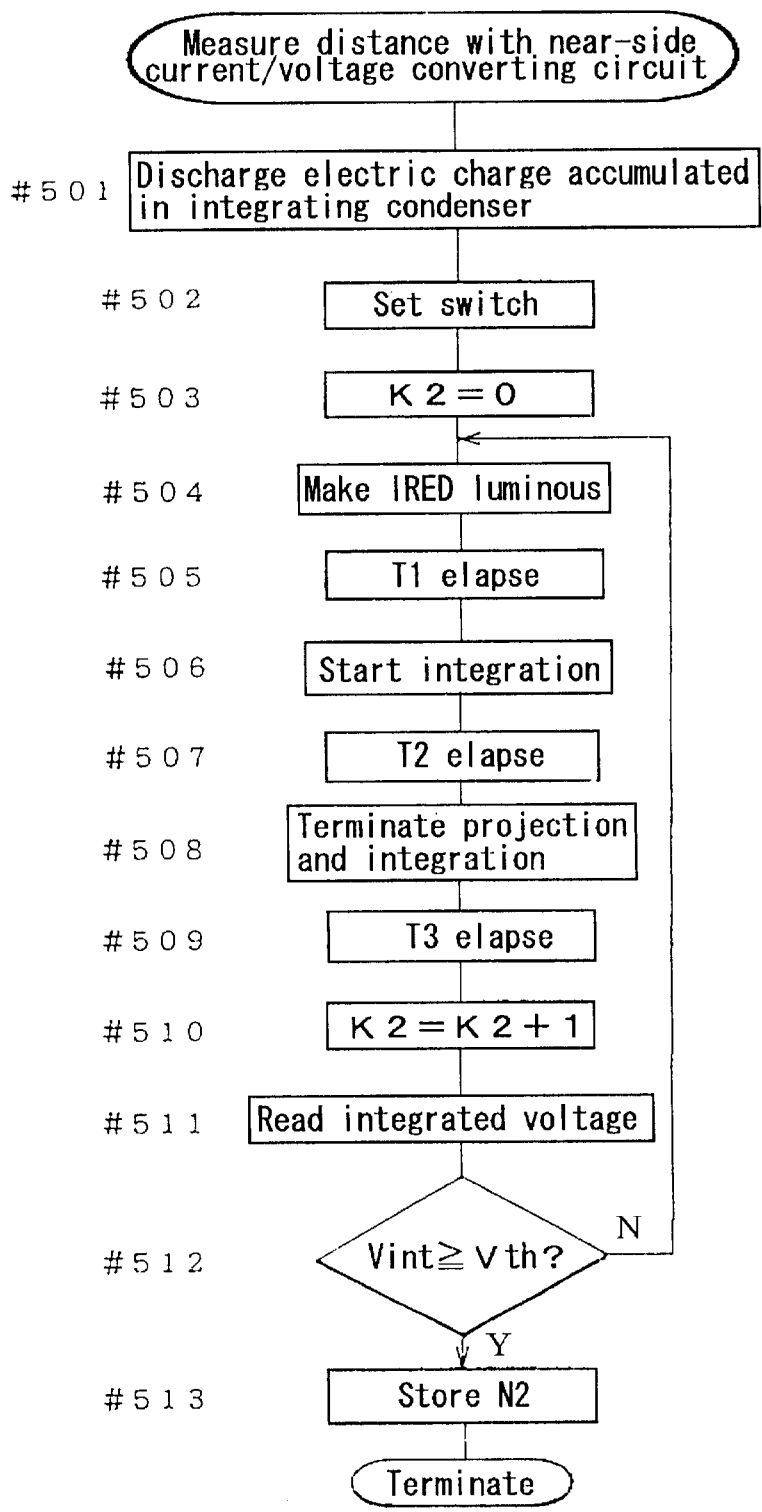
FIG. 14 is a flowchart representing a subroutine of a part for distance measurement effected by a near-side current/voltage converting circuit 30 in the flowchart of FIG. 9.

Subsequently, the subroutines for distance measurement by the near-side current/voltage converting circuit 30 will be explained with reference to FIG. 14. When the subroutines for distance measurement by the near-side current/voltage converting circuit 30 are called (#500), the CPU 70 turns the switch 64 ON to permit electric charge accumulated in the integrating capacitor 63 to be discharged. After the capacitor 63 is fully discharged, the switch 64 is turned OFF (#501). Subsequently, the CPU 70 turns the switch 4 ON toward the near-side current/voltage converting circuit 30, and turns the switches 8 and 9 OFF (#502). Thereafter, the counter 75 is cleared to zero (#503).

Subsequently, it passes into the operation of distance measurement. The CPU 70 drives the projecting circuit 10 to start projection (#504). In order to ensure a rise time for the respective amplifiers and mitigate influences of fluctuation of the electric source accompanying the startup of projection, the CPU waits for a time T1 (#505), then turns the switch 7 ON to start the integrating operation (#506), and waits for a time T2 (#507), during which electric charge is accumulated in the integrating capacitor 63. After the lapse of the time T2, the CPU stops actuation of the projecting circuit 10 to terminate the projecting operation, and turns the switch 7 OFF to terminate the integrating operation (#508). After being standby for a time T3 (#509), the CPU adds 1 to the counter 74 (#510), turns the switch 7 OFF and turns the switch 9 ON to output Vint to the A/D converter 71. The A/D converter 71 performs A/D conversion of the voltage to output the same to the CPU 70 (#511). The CPU 70 compares Vint with Vth3 (for example, 1.0 V) (#512) to jump to #504 for repetition of the projecting operation when Vint is smaller than Vth3. When Vint is greater than Vth3, the CPU calculates the number of times N2 on the basis of the number of times K2 in the counter 75 to store the same in the RAM 72 (#513), and leaves the subroutine. In the above-described operations, a distance to an object undergoing distance measurement is measured.

In addition, while in the above-mentioned example, a drift voltage per unit time of projection is found after gains of the current/voltage converting circuits and the amplifiers in the subsequent stage have been determined, gains of the current/voltage converting circuits and the amplifiers in the subsequent stage may be determined after a drift voltage per unit time of projection has been found.

Figure 9:
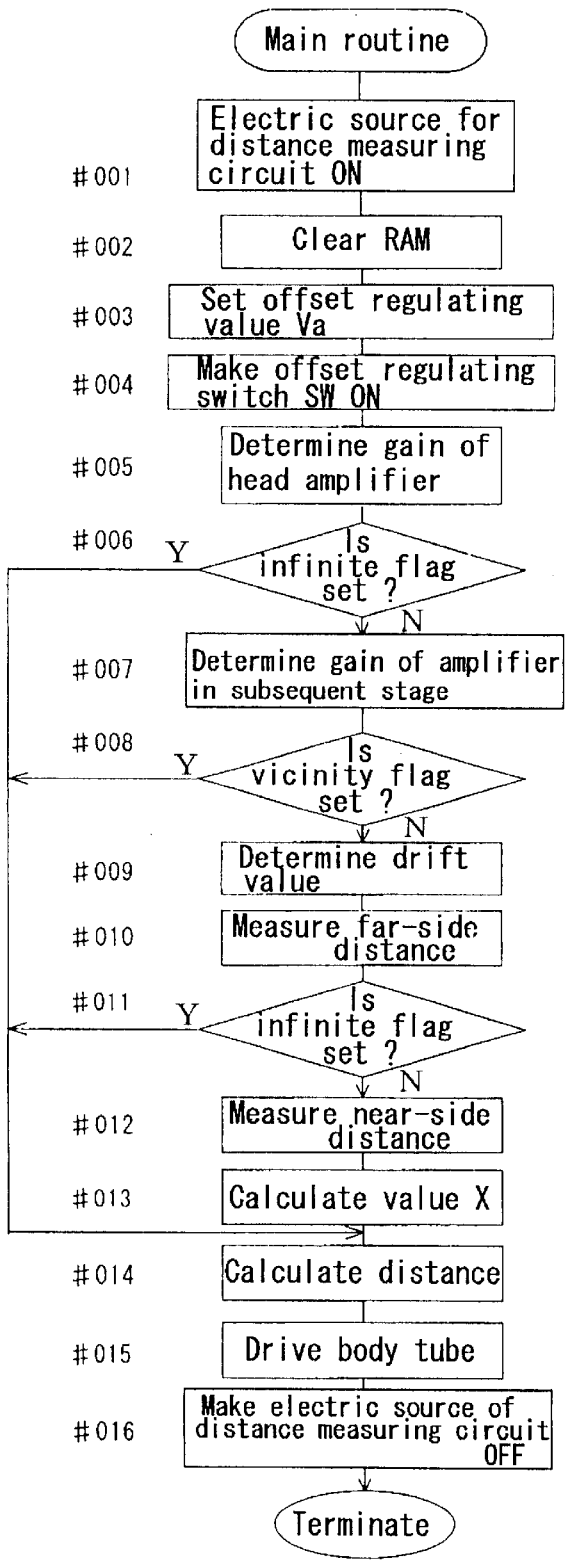
FIG. 9 is a flowchart representing the operation of distance measurement in the embodiment.
Figure 10:
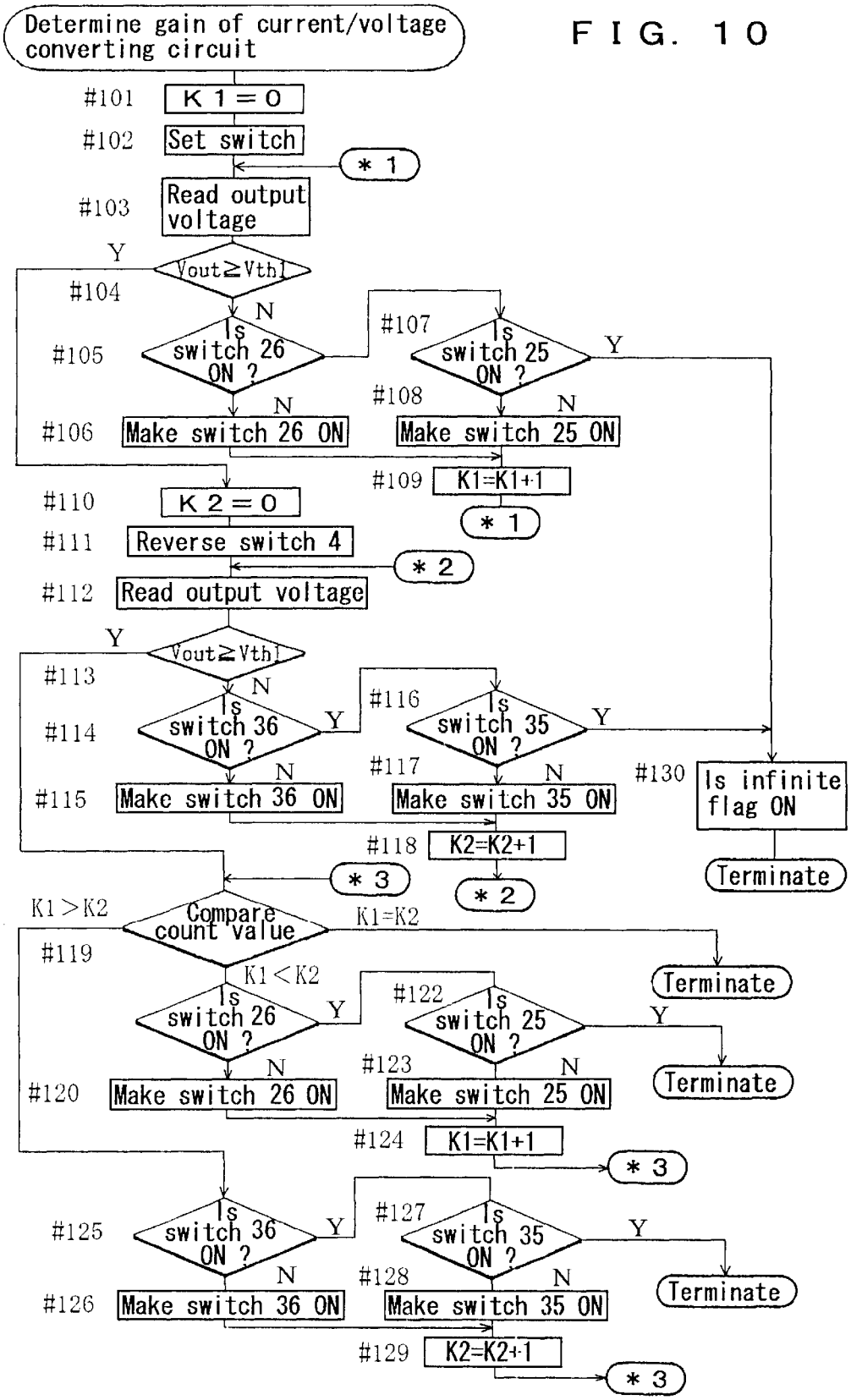
FIG. 10 is a flowchart representing a subroutine of a part for determination of gain of current/voltage converting circuits in the flowchart of FIG. 9.
Figure 15:
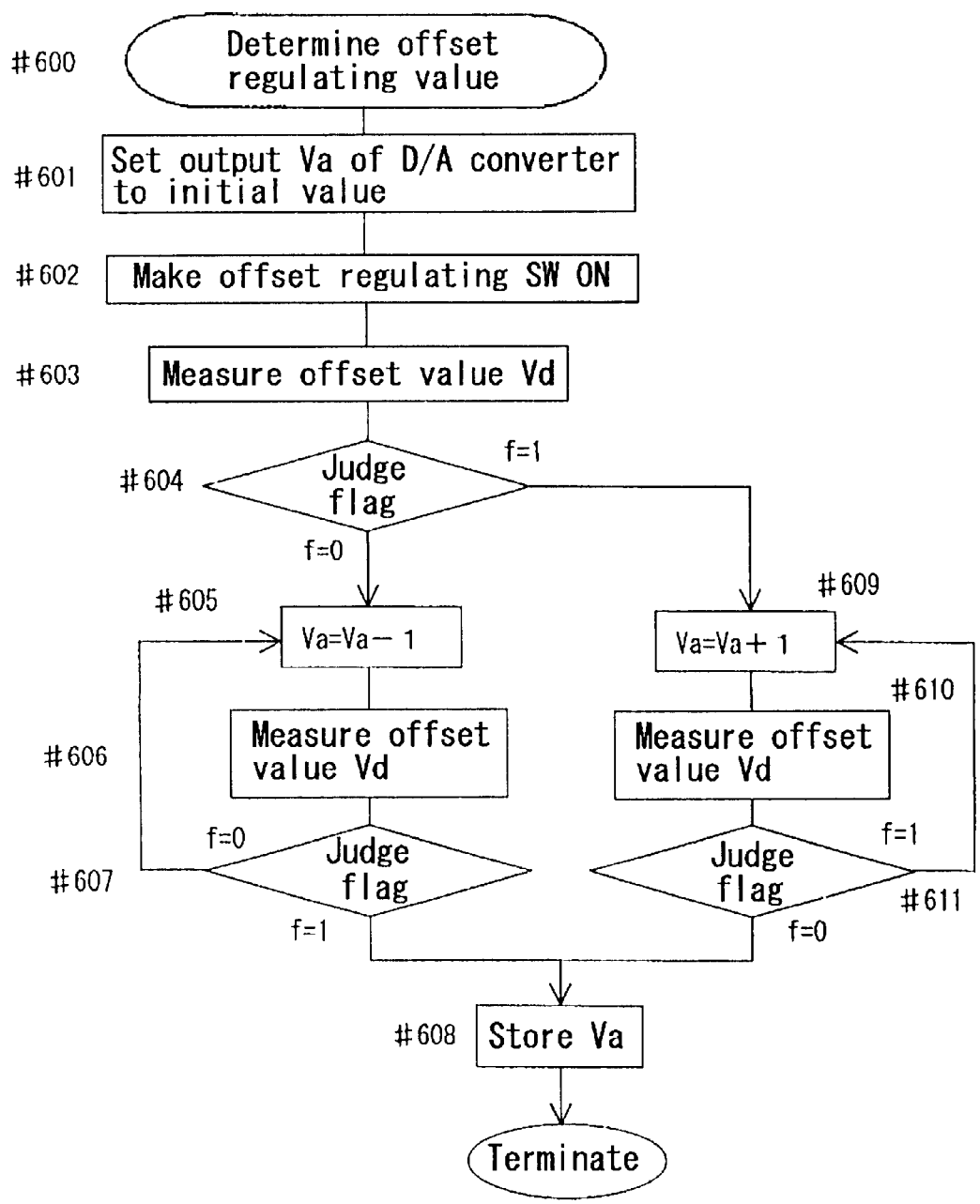
FIG. 15 is a flowchart representing a subroutine for determination of an offset regulating value.
Figure 16:
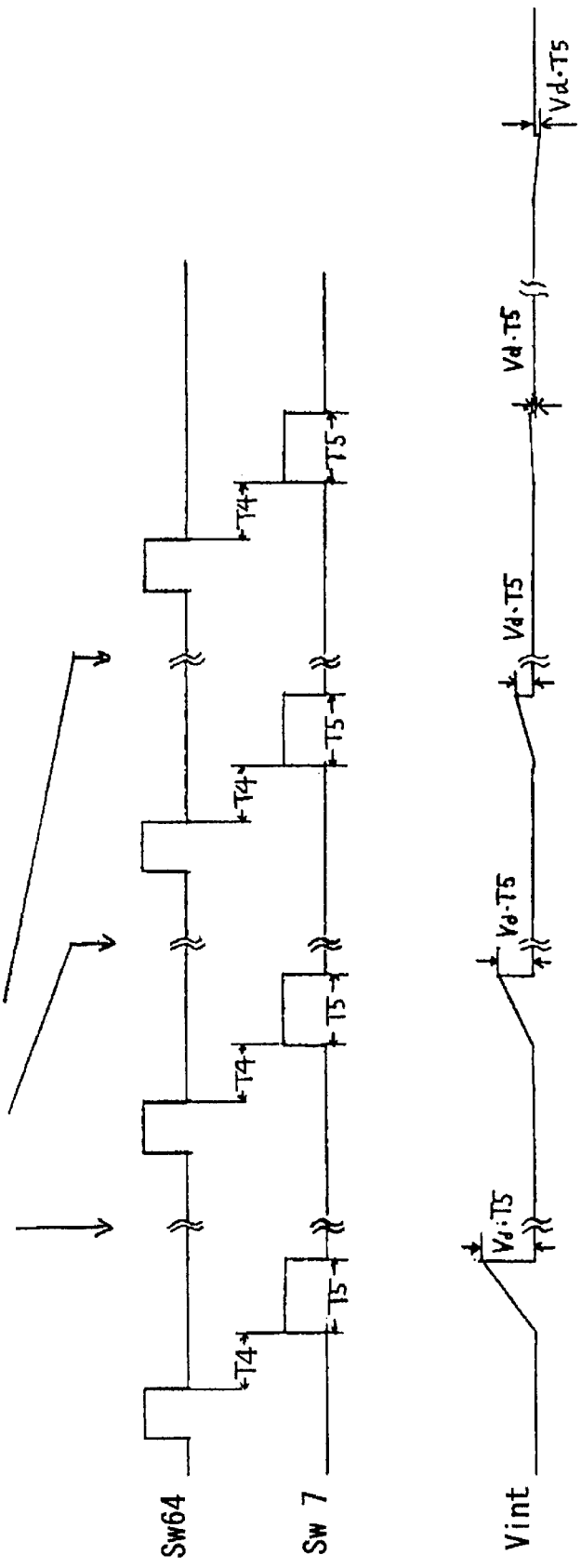
FIG. 16 is a view illustrating a method of regulating an offset.
Figure 17:
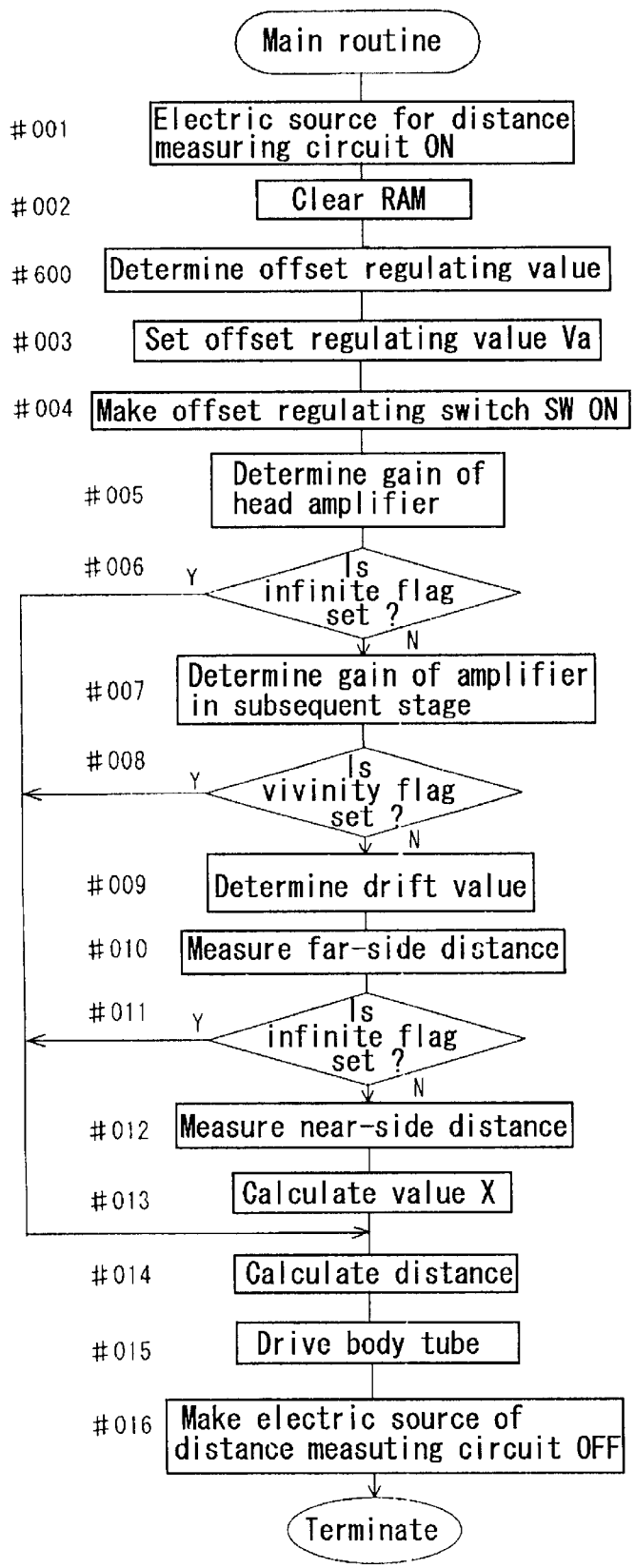
FIG. 17 is a view illustrating another example of the operation of distance measurement.

Also, while in the above-mentioned example, determination of an offset regulating value (#600) in FIG. 15 is effected prior to the operation of distance measurement in FIG. 9, the operation (#600) may be effected in the main routine as shown in FIG. 17, which makes it possible to correct a change in an offset value due to a change in environmental temperature at that time whenever the operation of distance measurement is effected, thereby enabling a more accurate distance measurement.

Also, while in determination of an offset regulating value in FIG. 15, an output voltage Va of the D/A converter 81 is sequentially changed, similar function and effect can be obtained in that constitution, in which the output voltage Va is kept constant and the regulating resistors 82, 83 are made variable.

Also, while in the above-mentioned example, a value stored in the storage circuit 79 is one in the analog voltage output circuit 81 after the regulation by the regulating circuit 80, it is not limited thereto but may be, for example, an offset value Vd calculated from the initial Vint shown in FIG. 16. The CPU 70 may calculate a regulating voltage required to cancel an offset value Vd stored in the storage circuit 79 at the time of distance measurement to be fed to the analog voltage output circuit 81 of the regulating circuit 80.

With the above construction, reference voltages in the amplifiers, which serve to amplify two outputs from the light receiving means, are regulated by the regulating circuit, whereby it is possible to cancel offset voltages of the amplifiers and of the integrating circuit on the basis of an output of the integrating circuit, and to provide a distance measuring device of good accuracy, in which measurement of a distance to an object undergoing distance measurement, effected by the calculating means is enhanced in accuracy and which is simple in construction.

What is claimed is:

1. A distance measuring device comprising: light projecting means for irradiating light onto an object undergoing distance measurement; light receiving means for receiving light irradiated by the light projecting means and reflected by the object generating two outputs that vary in value depending upon a position of received light; an amplifier for separately amplifying the two outputs of the light receiving means on the basis of a reference voltage; a regulating circuit for regulating the reference voltage so that the reference voltage has a desired value; an integrating circuit for integrating outputs of the amplifier and producing an integrated outputs; and calculating means for calculating a distance to the object undergoing distance measurement based on integrated outputs of the integrating circuit corresponding to the two outputs of the light receiving means; wherein the regulating circuit regulates the reference voltage on the basis of offset voltages of the amplifier and of the integrating circuit, so that an output of the amplifier reduces effects of the offset voltages on the calculated distance.

2. A distance measuring device according to claim 1; further comprising a storage circuit for storing a value representing offset voltages of the amplifier and the integrating circuit, the stored value being supplied to the regulating circuit to set the reference voltage on the basis of the offset voltages of the amplifier and the integrating circuit.

3. A distance measuring device according to claim 2; wherein the regulating circuit comprises an analog voltage output circuit for outputting an analog voltage to the amplifier, regulating resistors connected to an output of the analog voltage output circuit, and a switching element for connecting the output of the analog voltage output circuit to the regulating resistors.

4. A distance measuring device according to claim 3; wherein the calculating means includes means for determining offset voltages of the amplifier and the integrating circuit by controlling the integrating circuit to integrate an output of the amplifier when no light is being emitted by the light projecting means.

5. A distance measuring device according to claim 2; wherein the calculating means includes means for determining offset voltages of the amplifier and the integrating circuit by controlling the integrating circuit to integrate an output of the amplifier when no light is being emitted by the light projecting means.

6. A distance measuring device according to claim 1; wherein the regulating circuit comprises an analog voltage output circuit for outputting an analog voltage to the amplifier, regulating resistors connected to an output of the analog voltage output circuit, and a switching element for connecting the output of the analog voltage output circuit to the regulating resistors.

7. A distance measuring device accordingto claim 3; wherein the analog voltage output circuit comprises a D/A converter.

8. A distance measuring device according to claim 1; wherein the calculating means includes means for determining offset voltages of the amplifier and the integrating circuit by controlling the integrating circuit to integrate an output of the amplifier when no light is being emitted by the light projecting means.

9. A distance measuring device according to claim 1; wherein the amplifier comprises a two-stage variable-gain amplifier circuit.

10. A distance measuring device according to claim 9; wherein each stage of the two-stage variable-gain amplifier circuit comprises a variable-gain amplifier having a feedback loop comprising a plurality of resistors and switches for selectively connecting respective resistors to the feedback loop.

11. A distance measuring device according to claim 10; wherein the calculating means includes means for performing a gain-setting procedure comprising the steps of controlling the light emitting means to project a predetermined number of pulses of light, controlling the integrating circuit to integrate an output of the amplifier until an output of the integrating circuit reaches a predetermined value, and, if the output of the integrating circuit exceeds the predetermined value before the predetermined number of pulses of light have been emitted, sequentially reducing the gain of the variable-gain amplifiers.

12. A distance measuring device according to claim 1; wherein the integrating circuit comprises an amplifier, an input resistor, an integrating capacitor, and a voltage follower.

13. A distance measuring device according to claim 1; wherein the light receiving means comprises a Position Sensitive Device (PSD).

14. A distance measuring device comprising: light projecting means for projecting light onto an object; light receiving means for receiving light reflected by the object; an amplifying circuit for separately amplifying outputs of the light receiving means based on a reference voltage; a regulating circuit for regulating the reference voltage; an integrating circuit for integrating an output of the amplifying circuit; and calculating means for calculating a distance to the object based upon an output of the integrating circuit; wherein the regulating circuit regulates the reference voltage on the basis of offset voltages of the amplifier the integrating circuit.

15. A distance measuring device according to claim 14; wherein the amplifying circuit comprises a two-stage variable-gain amplifier circuit.

16. A distance measuring device according to claim 15; wherein each stage of the two-stage variable-gain amplifier circuit comprises a variable-gain amplifier having a feedback loop comprising a plurality of resistors and switches for selectively connecting respective resistors to the feedback loop.

17. A distance measuring device according to claim 14; wherein the calculating means includes means for performing a gain-setting procedure comprising the steps of controlling the light projecting means to project a predetermined number of pulses of light, controlling the integrating circuit to integrate an output of the amplifying means until an output of the integrating circuit reaches a predetermined value, and, if the output of the integrating circuit exceeds the predetermined value before the predetermined number of pulses of light have been emitted, sequentially reducing the gain of the variable-gain amplifiers.

18. A distance measuring device according to claim 14; wherein the integrating circuit comprises an amplifier, an input resistor, an integrating capacitor and a voltage follower.

19. A distance measuring device according to claim 14; wherein the light receiving means comprises a Position Sensitive Device.

20. A distance measuring device according to claim 14; wherein the calculating means includes means for determining offset voltages of the amplifier and the integrating circuit by controlling the integrating circuit to integrate an output of the amplifier when no light is being emitted by the light projecting means.

* * * * *